(12) United States Patent
Goodbar (10) Patent No.: US 12,252,202 B2
(45) Date of Patent: Mar. 18, 2025

(54) SYSTEM AND METHOD FOR ALERTING USERS OF SAFTEY MEASURES

(71) Applicant: Aimee Lynn Goodbar, Colorado Springs, CO (US)

(72) Inventor: Aimee Lynn Goodbar, Colorado Springs, CO (US)

( * ) Notice: Subject to any disclaimer, the term of this patent is extended or adjusted under 35 U.S.C. 154(b) by 81 days.

(21) Appl. No.: 18/021,483

(22) PCT Filed: Aug. 26, 2021

(86) PCT No.: PCT/US2021/047737
§ 371 (c)(1),
(2) Date: Feb. 15, 2023

(87) PCT Pub. No.: WO2022/051166
PCT Pub. Date: Mar. 10, 2022

(65) Prior Publication Data
US 2023/0399068 A1    Dec. 14, 2023

Related U.S. Application Data (60) Provisional application No. 63/089,255, filed on Oct. 8, 2020, provisional application No. 63/073,836, filed on Sep. 2, 2020.

(51) Int. Cl.
*B62J 3/12* (2020.01)
*B62J 45/41* (2020.01)
*B62J 45/42* (2020.01)

(52) U.S. Cl.
CPC ............. *B62J 3/12* (2020.02); *B62J 45/41* (2020.02); *B62J 45/42* (2020.02)

(58) Field of Classification Search
CPC ............. B62J 45/41; B62J 45/42; B62J 3/12
See application file for complete search history.

(56) References Cited

U.S. PATENT DOCUMENTS

| | | | |
|---|---|---|---|
| 5,294,914 A | 3/1994 | Dallas | |
| 5,697,099 A * | 12/1997 | Siska, Jr. | G08B 25/016 2/5 |
| 9,399,398 B1 * | 7/2016 | Logan | B60L 3/08 |
| 9,550,418 B1 * | 1/2017 | Logan | B60L 15/10 |
| 11,044,961 B1 * | 6/2021 | Craig | A42B 3/046 |
| 2009/0002161 A1 | 1/2009 | Luciani | |
| 2013/0093585 A1 * | 4/2013 | Ambani | B62J 6/045 340/475 |
| 2016/0144915 A1 | 5/2016 | Bejestan et al. | |
| 2021/0274875 A1 * | 9/2021 | Glenn | G01V 11/00 |

FOREIGN PATENT DOCUMENTS

| | | |
|---|---|---|
| WO | 2015162624 A2 | 10/2015 |
| WO | 2016206693 A1 | 12/2016 |

OTHER PUBLICATIONS

International Search Report and Written Opinion received in International Application No. PCT/US2021/047737 mailed Nov. 26, 2021, pp. 1-10.

* cited by examiner

*Primary Examiner* — Sisay Yacob
(74) *Attorney, Agent, or Firm* — Offit Kurman; Tod A. Kupstas (57) ABSTRACT

An alarm system for bicycles and other vehicles where helmets are used by the user. A helmet detection unit is located in the seat of a bicycle or in the standing area of a scooter and is able to ascertain whether or not the user is wearing a helmet. When the use is not wearing a helmet, an alarm is activated that alerts the user that a helmet should be worn.

20 Claims, 6 Drawing Sheets

SYSTEM AND METHOD FOR ALERTING USERS OF SAFTEY MEASURES

This application claims the benefit of U.S. Provisional Application Ser. No. 63/073,836, filed Sep. 2, 2020, and U.S. Provisional Application Ser. No. 63/089,255, the contents of the aforementioned applications incorporated herein by reference.

BACKGROUND

1. Field

This application is directed to the field of transportation. In particular, the application is directed to safety features used in the operation of vehicles where the user is at risk of falling from the vehicle, such as with bicycles and motorcycles.

2. Description of the Related Art

In some situations, wearing a helmet while riding bicycles or operating motorized vehicles is important for maintaining the safety of the people using the vehicles. Currently, mechanisms that alerts a user that they are not wearing a helmet or other safety gear are not readily available to potential riders and passengers of the vehicle.

Therefore, there remains a need in the field to be able to increase the awareness of those who are operating bicycles and vehicles that they are not wearing a helmet, or appropriate safety gear.

SUMMARY

Briefly described, aspects of the present disclosure relate to the use of helmets with vehicles.

An aspect of the present disclosure is a safety system. The safety system comprises a helmet detection unit adapted to be operably connected to a vehicle, wherein the helmet detection unit is adapted to transmit a signal; and an alarm unit adapted to be operably connected to the vehicle, wherein the alarm unit is adapted to receive the signal from the helmet detection unit; and wherein the alarm unit is adapted to trigger an alarm in response to determination that a user of the vehicle is not wearing a helmet.

Another aspect of the present disclosure is a method for providing safety. The method comprises determining if a helmet is being worn by a user with a helmet detection unit operably located on a vehicle, transmitting a signal when the helmet detection unit determines the helmet is not being worn; receiving the signal at an alarm unit located on the vehicle; and triggering an alarm from the alarm unit.

DETAILED DESCRIPTION

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art.

The components described hereinafter as making up the various embodiments are intended to be illustrative and not restrictive. Many suitable components that would perform the same or a similar function as the components described herein are intended to be embraced within the scope of embodiments of the present disclosure.

Figure 1:
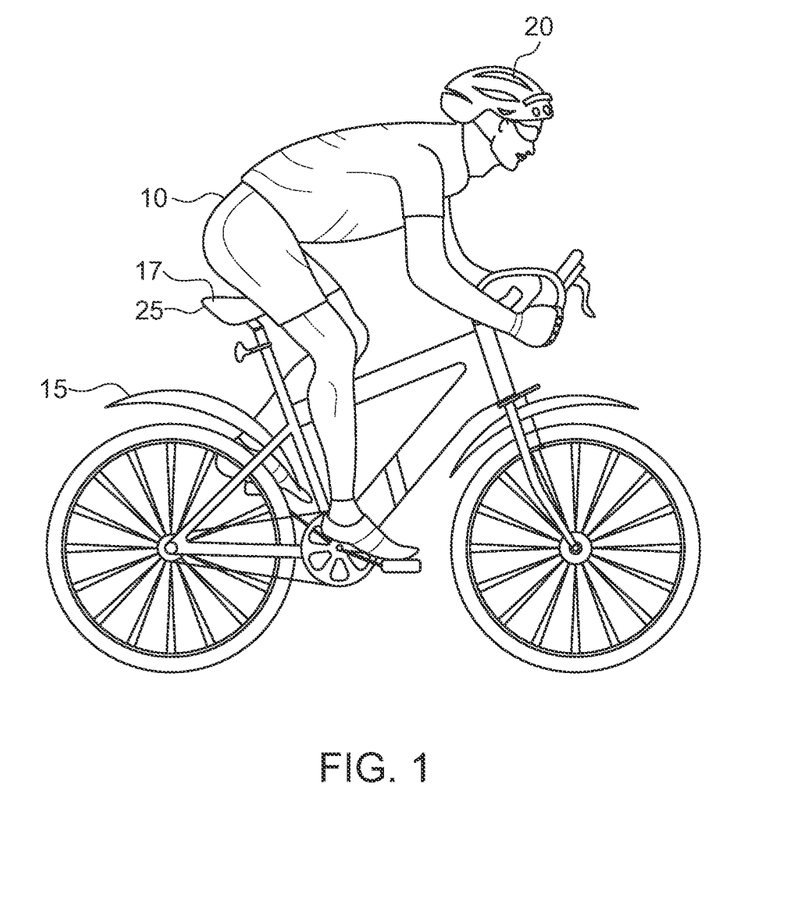
FIG. 1 is a view of a person on a bike having a helmet alarm unit.

Referring to FIG. 1, shown is a person 10 on a bicycle 15. The bicycle may either be mechanical or electric. The person 10 on the bicycle 15 is wearing a helmet 20.

The bicycle 15 is adapted to have contained therein or thereon a helmet detection unit 25. In an embodiment, the helmet detection unit 25 is formed as part of the bicycle 15 itself. In an embodiment, the helmet detection unit 25 is separate from the bicycle 15 and is removably secured to the bicycle 15. In an embodiment, the helmet detection unit 25 is integrally formed with the bicycle 15.

In operation, a user places the helmet 20 on his or her head and the helmet detection unit 25 is able to ascertain that the helmet 20 is located on the person 10. When a person 10 is on the bicycle 15 and is not wearing a helmet 20, an alarm unit 17 is activated that is able to emit sounds that will alert a person 10 that they are not wearing the helmet 20. In FIG. 1, the alarm unit 17 is shown as being separate from the helmet detection unit 25, however in an embodiment the alarm unit 17 and the helmet detection unit 25 are housed in the same housing. In an embodiment, the alarm unit 17 emits a visual indication that the helmet is not worn. In an embodiment, the alarm unit 17 emits a tactile indication (i.e., vibrational alert or other alert that is able to be sensed by the body) that the helmet is not worn.

In an embodiment, the helmet detection unit 25 is located in the seat of the bicycle 15. The person 10 who is using the bicycle 15 can sit on the bicycle 25 and establish the initial weight of the person 10 with the helmet 20 being worn. In an embodiment, the person can establish two weights, one with the person 10 wearing the helmet 20 and one without the person 10 wearing the helmet 20. In an embodiment, profiles for different people can be stored by the bicycle 15.

The helmet detection unit 25 may further have different time delays built into it for the activation of the alarm so that the helmet detection unit 25 may not trigger the alarm unit 17 during periods of time when a person 10 may be standing when using the bicycle 15 (such as when climbing a hill).

The helmet detection unit 25 may use other sensing mechanisms to determine if a helmet 20 is located proximate to the bicycle 15. These additional detection mechanisms may function in cooperation with the helmet detection unit 25 to further verify that a helmet 20 is present, or in some instances function in lieu of the helmet detection unit 25 (or can be another functional part of the helmet detection unit 25). In an embodiment, the alarm unit 17 may activate when the helmet detection unit 25 is triggered. In an embodiment, the alarm unit 17 may only activate when the helmet detection unit 25 and the secondary sensing mechanism indicates that a helmet 20 is not present. In an embodiment, the alarm unit 17 may be triggered if any of the sensing mechanisms indicate that the helmet 20 is not present.

In an embodiment, the helmet detection unit 25 has a secondary sensing mechanism that is a capacitive based sensor that is able to determine if the helmet 20 is located proximate to a person 10. In an embodiment, the helmet detection unit 25 has a secondary sensing mechanism that uses an inertial sensor that is able to correlate specific types of movement to the wearing of a helmet 20. In an embodiment, the helmet detection unit 25 has a secondary sensing mechanism that is an RFID enabled system that is activated when the helmet 20 is present. In an embodiment, the helmet detection unit 25 uses a combination of inertial sensors and capacitive sensors. In an embodiment, the secondary sensing mechanism for the helmet detection unit uses optical sensors. In an embodiment, the secondary sensing mechanism for the helmet detection unit 25 uses audio sensors. In an embodiment, the secondary sensing mechanism for the helmet detection unit 25 uses one or more of the aforementioned sensors. In an embodiment, any of the aforementioned systems are used to indicate when the helmet is present either separately or in combination.

Upon determination that a helmet 20 is not being worn by a person the helmet detection unit 25 will transmit a signal to the alarm unit 17. The alarm unit 17 is adapted to trigger an alarm when it receives an activation signal from the helmet detection unit 25. The alarm can sound until the helmet 20 is detected. In an embodiment, the alarm can be transmitted directly to a person's headphones.

Figure 2:
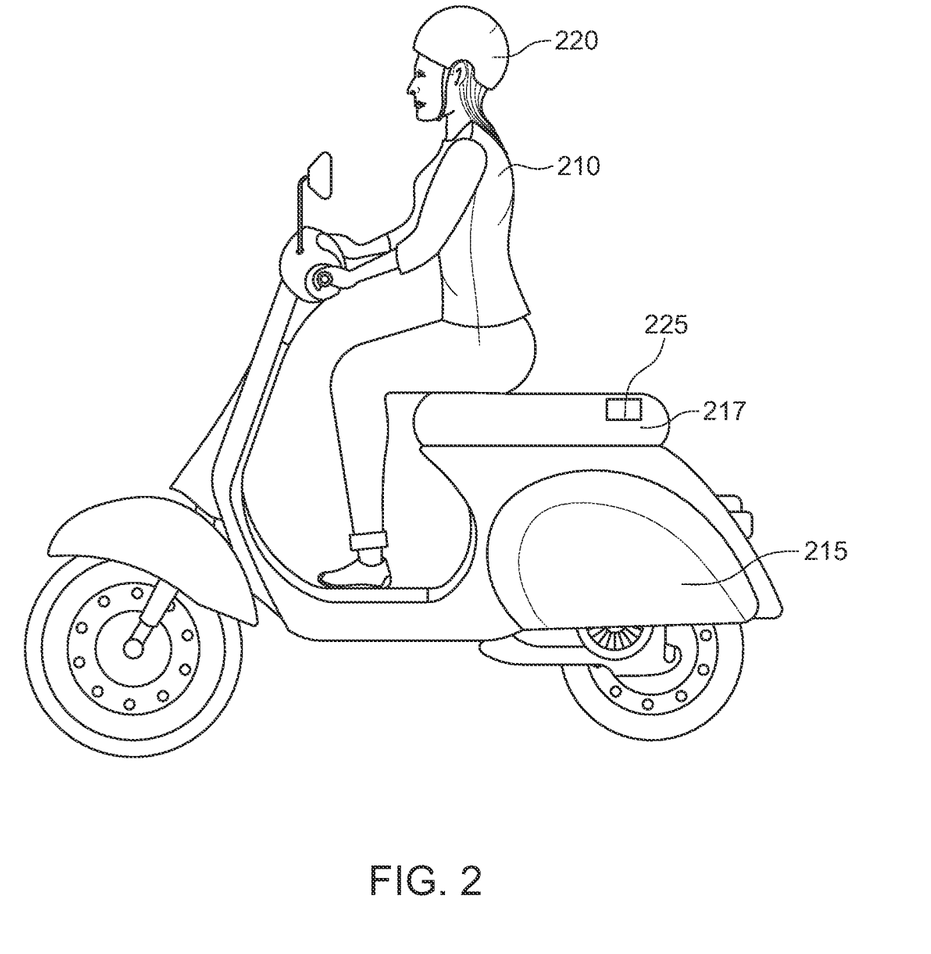
FIG. 2 is a view of a person on a moped having a helmet alarm unit.

Referring to FIG. 2, shown is a person 210 on a moped 215. The person 210 on the moped 215 is wearing a helmet 220.

The moped 215 is adapted to have contained therein or thereon a helmet detection unit 225. In an embodiment, the helmet detection unit 225 is formed as part of the moped 215 itself. In an embodiment, the helmet detection unit 225 is separate from the moped 215 and is removably secured to the moped 215. In an embodiment, the helmet detection unit 225 is integrally formed with the moped 215.

In operation, a user places the helmet 220 on his or her head and the helmet detection unit 225 is able to ascertain that the helmet 220 is located on the person 210. When a person 210 is on the moped 215 and is not wearing a helmet 220, an alarm unit 217 is activated that is able to emit sounds that will alert a person 210 that they are not wearing the helmet 220. In an embodiment, the alarm unit 217 is adapted to disable the engine of the moped 215 upon detection of a person 210 who is not wearing a helmet 220. In FIG. 2, the alarm unit 217 is shown as being separate from the helmet detection unit 225, however in an embodiment the alarm unit 217 and the helmet detection unit 225 are housed in the same housing. In an embodiment, the alarm unit 217 emits a visual indication that the helmet is not worn. In an embodiment, the alarm unit 217 emits a tactile indication (i.e., vibrational alert or other alert that is able to be sensed by the body) that the helmet is not worn.

In an embodiment, the helmet detection unit 225 is located in the seat of the moped 215. The person 210 who is using the moped 215 can sit on the moped 215 and establish the initial weight of the person 210 with the helmet 220 being worn. In an embodiment, the person can establish two weights, one with the person 210 wearing the helmet 220 and one without the person 210 wearing the helmet 220. In an embodiment, profiles for different people can be stored on the moped 215.

The helmet detection unit 225 may use other sensing mechanisms to determine if a helmet 220 is located proximate to the moped 215. These additional detection mechanisms may function in cooperation with the helmet detection unit 225 in order to further verify that a helmet 220 is present, or in some instances function in lieu of the helmet detection unit 225 (or is another functional part of the helmet detection unit 225). In an embodiment, the alarm unit 217 may activate when the helmet detection unit 225 is triggered. In an embodiment, the alarm unit 217 may only activate when the helmet detection unit 225 and the secondary sensing mechanism indicates that a helmet 220 is not present. In an embodiment, the alarm unit 217 may be triggered if any of the sensing mechanisms indicate that helmet 220 is not present.

In an embodiment, the helmet detection unit 225 has a secondary sensing mechanism that is a capacitive based sensor that is able to determine if the helmet 220 is located proximate to a person 210. In an embodiment, the helmet detection unit 225 has a secondary sensing mechanism that uses an inertial sensor that is able to correlate specific types of movement to the wearing of a helmet 220. In an embodiment, the helmet detection unit 225 has a secondary sensing mechanism that is an RFID enabled system that is activated when the helmet 220 is present. In an embodiment, the helmet detection unit 225 uses a combination of inertial sensors and capacitive sensors. In an embodiment, the secondary sensing mechanism for the helmet detection unit 225 uses optical sensors. In an embodiment, the secondary sensing mechanism for the helmet detection unit 225 uses audio sensors. In an embodiment, the secondary sensing mechanism for the helmet detection unit 225 uses one or more of the aforementioned sensors. In an embodiment, any of the aforementioned systems are used to indicate when the helmet is present either separately or in combination.

Upon determination that a helmet 220 is not being worn by a person 210, the helmet detection unit 225 will transmit a signal to the alarm unit 217. The alarm unit 217 is adapted to trigger an alarm when it receives an activation signal from the helmet detection unit 225. The alarm can sound until the helmet is placed back on the person 210. In an embodiment, the alarm unit 217 (or the helmet detection unit 225) can transmit a signal that disables the moped 215.

Figure 3:
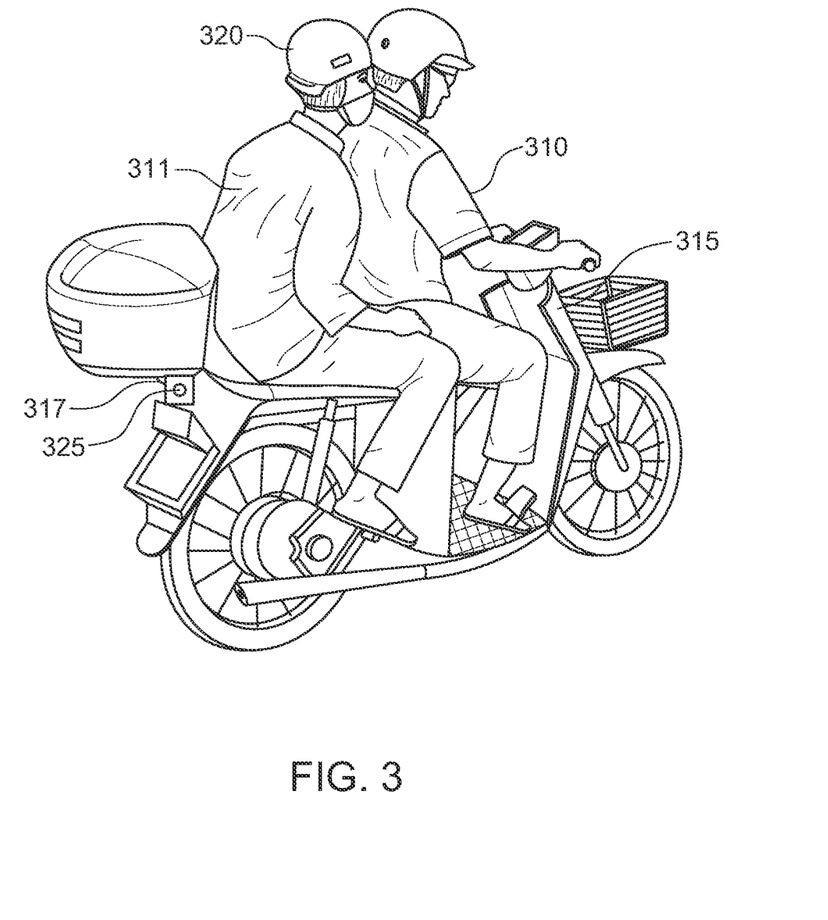
FIG. 3 is a view of people on a motorcycle having a helmet alarm unit.

Referring to FIG. 3, shown are persons 310 and 311 on a motorcycle 315. The persons 310 and 311 on the motorcycles 315 are wearing helmets 320.

The motorcycle 315 is adapted to have contained therein or thereon a helmet detection unit 325. In an embodiment, the helmet detection unit 325 is formed as part of the motorcycle 315 itself. In an embodiment, the helmet detection unit 325 is separate from the motorcycle 315 and is removably secured to the motorcycle 315. In an embodiment, the helmet detection unit 325 is integrally formed with the motorcycle 315.

In operation, a user places the helmet 320 on his or her head and the helmet detection unit 325 is able to ascertain that the helmet 320 is located on the person 310. When a person 310 or 311 is on the motorcycle 315 and is not wearing a helmet 320, an alarm unit 317 is activated that is able to emit sounds that will alert a person 310 that they are not wearing the helmet 320. In FIG. 3, the alarm unit 317 is shown as being separate from the helmet detection unit 325, however in an embodiment the alarm unit 317 and the helmet detection unit 325 are housed in the same housing. In an embodiment, the alarm unit 317 emits a visual indication that the helmet is not worn. In an embodiment, the alarm unit 317 emits a tactile indication (i.e., vibrational alert or other alert that is able to be sensed by the body) that the helmet is not worn.

In an embodiment, the helmet detection unit 325 is located in the seat of the motorcycle 315. The person 310 or 311 who is using the motorcycle 315 can sit on the motorcycle 315 and establish the initial weight of the person 310 and/or 311 with the helmet 320 being worn. In an embodiment, the person can establish more than one weight, one with the person 310 wearing the helmet 320, one without the person 310 wearing the helmet 320, one with the person 311 wearing a helmet 320, one without the person 311 wearing the helmet 320. Furthermore, variations of the weights can be stored. Additionally, variations of the people wearing and not wearing the helmets 320 can be stored. In an embodiment, profiles for different people can be stored by the motorcycle 315.

The helmet detection unit 325 may further have different time delays built into it for the activation of the alarm so that the helmet detection unit 325 may not trigger the alarm unit 317 during periods of time when a person 310 may be standing when using the motorcycle 315.

The helmet detection unit 325 may use other sensing mechanisms to determine if a helmet 320 is located proximate to the motorcycle 315. These additional detection mechanisms may function in cooperation with the helmet detection unit 325 in order to further verify that a helmet 320 is present, or in some instances function in lieu of the helmet detection unit 325 (or is another functional part of the helmet detection unit 325). In an embodiment, the alarm unit 317 may activate when the helmet detection unit 325 is triggered. In an embodiment, the alarm unit 317 may only activate when the helmet detection unit 325 and the secondary sensing mechanism indicates that a helmet 320 is not present. In an embodiment, the alarm unit 317 may be triggered if any of the sensing mechanisms indicate that helmet 320 is not present. In an embodiment, the alarm unit 317 (or the helmet detection unit 325) can transmit a signal that disables the moped 315.

In an embodiment, the helmet detection unit 325 has a secondary sensing mechanism that is a capacitive based sensor that is able to determine if the helmet 320 is located proximate to a person 310. In an embodiment, the helmet detection unit 325 has a secondary sensing mechanism that uses an inertial sensor that is able to correlate specific types of movement to the wearing of a helmet 320. In an embodiment, the helmet detection unit 325 has a second sensing mechanism is an RFID enabled system that is activated when the helmet 320 is present. In an embodiment, the helmet detection unit 325 uses a combination of inertial sensors and capacitive sensors. In an embodiment, the secondary sensing mechanism for the helmet detection unit 325 uses optical sensors. In an embodiment, the secondary sensing mechanism for the helmet detection unit 325 uses audio sensors. In an embodiment, the secondary sensing mechanism for the helmet detection unit 325 uses one or more of the aforementioned sensors. In an embodiment, any of the aforementioned systems are used to indicate when the helmet is present either separately or in combination.

Upon determination that a helmet 320 is not being worn by a person 310 or by the person 311, when more than one person is detected, the helmet detection unit 325 will transmit a signal to the alarm unit 317. The alarm unit 317 is adapted to trigger an alarm when it receives an activation signal from the helmet detection unit 325. The alarm can sound until the helmet is placed back on the person 330. In an embodiment, the alarm unit 317 (or the helmet detection unit 325) can transmit a signal that disables the moped 315.

Figure 4:
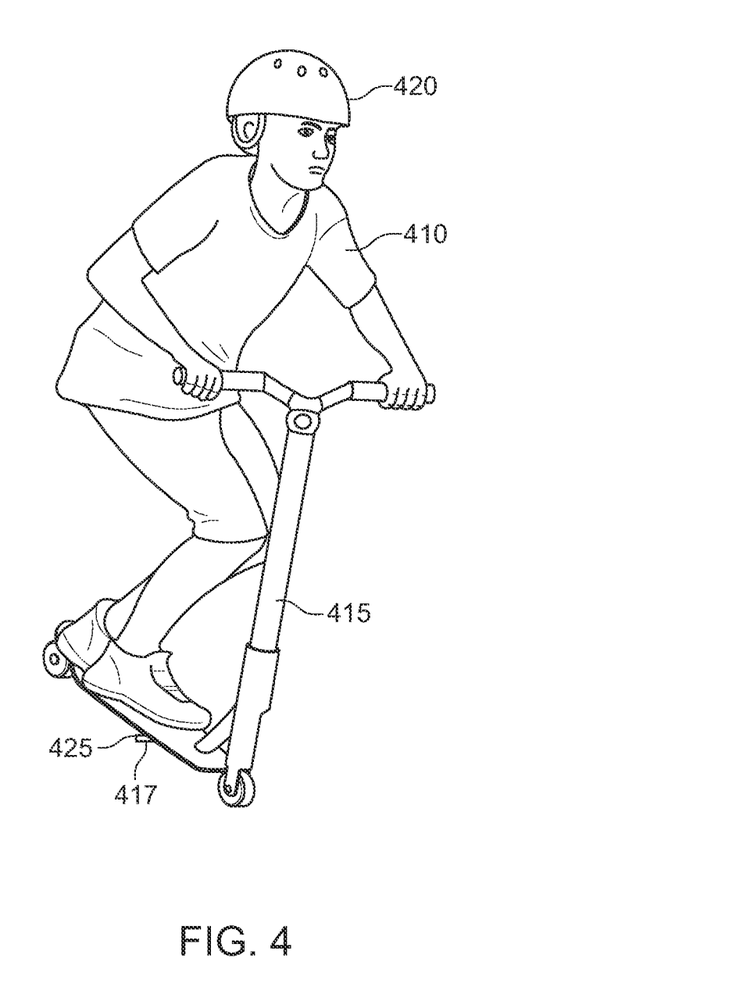
FIG. 4 is a view of a person on a scooter.

Referring to FIG. 4, shown is a person 410 on a scooter 415. The person 410 on the scooter 415 is wearing a helmet 420.

The scooter 415 is adapted to have contained therein or thereon a helmet detection unit 425. In an embodiment, the helmet detection unit 425 is formed as part of the scooter 415 itself. In an embodiment, the helmet detection unit 425 is separate from the scooter 415 and is removably secured to the scooter 415. In an embodiment, the helmet detection unit 425 is integrally formed with the scooter 415.

In operation, a user places the helmet 420 on his or her head and the helmet detection unit 425 is able to ascertain that the helmet 420 is located on the person 410. When a person 410 is on the scooter 415 and is not wearing a helmet 420, an alarm unit 417 is activated that is able emit sounds that will alert a person 410 that they are not wearing the helmet 420. In FIG. 4, the alarm unit 417 is shown as being separate from the helmet detection unit 425, however in an embodiment the alarm unit 417 and the helmet detection unit 425 are housed in the same housing. In an embodiment, the alarm unit 417 emits a visual indication that the helmet is not worn. In an embodiment, the alarm unit 417 emits a tactile indication (i.e., vibrational alert or other alert that is able to be sensed by the body) that the helmet is not worn.

In an embodiment, the helmet detection unit 425 is located in the standing area of the scooter 415. The person 410 who is using the scooter 415 can stand on the scooter 415 and establish the initial weight of the person 410 with the helmet 420 being worn. In an embodiment, the person can establish two weights, one with the person 410 wearing the helmet 420 and one without the person 410 wearing the helmet 420. In an embodiment, profiles for different people can have profiles stored for the scooter 415.

The helmet detection unit 425 may use other sensing mechanisms to determine if a helmet 420 is located proximate to the scooter 415. These additional detection mechanisms may function in cooperation with the helmet detection unit 425 to further verify that a helmet 420 is present, or in some instances function in lieu of the helmet detection unit 425 (or is another functional part of the helmet detection unit 425). In an embodiment, the alarm unit 417 may activate when the helmet detection unit 425 is triggered. In an embodiment, the alarm unit 417 may only activate when the helmet detection unit 425 and the secondary sensing mechanism indicates that a helmet 420 is not present. In an embodiment, the alarm unit 417 may be triggered if any of the sensing mechanisms indicate that helmet 420 is not present.

In an embodiment, the helmet detection unit 425 has a secondary sensing mechanism that is a capacitive based sensor that is able to determine if the helmet 420 is located proximate to a person 410. In an embodiment, the helmet detection unit 425 has a secondary sensing mechanism that uses an inertial sensor that is able to correlate specific types of movement to the wearing of a helmet 420. In an embodiment, the helmet detection unit 425 has a secondary sensing mechanism that is an RFID enabled system that is activated when the helmet 420 is present. In an embodiment, the helmet detection unit 425 uses a combination of inertial sensors and capacitive sensors. In an embodiment, the secondary sensing mechanism for the helmet detection unit 425 uses optical sensors. In an embodiment, the secondary sensing mechanism for the helmet detection unit 425 uses audio sensors. In an embodiment, the secondary sensing mechanism for the helmet detection unit 425 uses one or more of the aforementioned sensors. In an embodiment, any of the aforementioned systems are used to indicate when the helmet 420 is present either separately or in combination.

Upon determination that a helmet 420 is not being worn by a person 410, the helmet detection unit 425 will transmit a signal to the alarm unit 417. The alarm unit 417 is adapted to trigger an alarm when it receives an activation signal from the helmet detection unit 425. The alarm can sound until the helmet is placed back on the person 410. In instances where the scooter 415 is powered, activation of the helmet detection unit 425 can also trigger deactivation of the motor.

Figure 5:
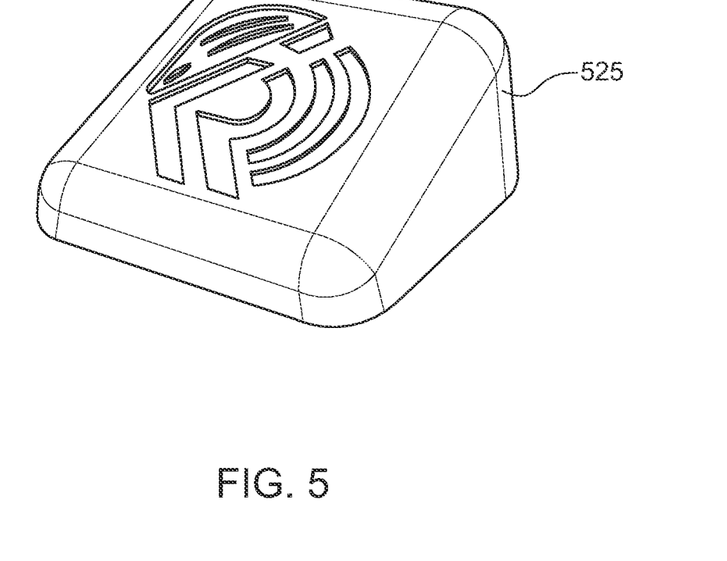
FIG. 5 is a view of an embodiment of a helmet alarm unit.
Figure 6:
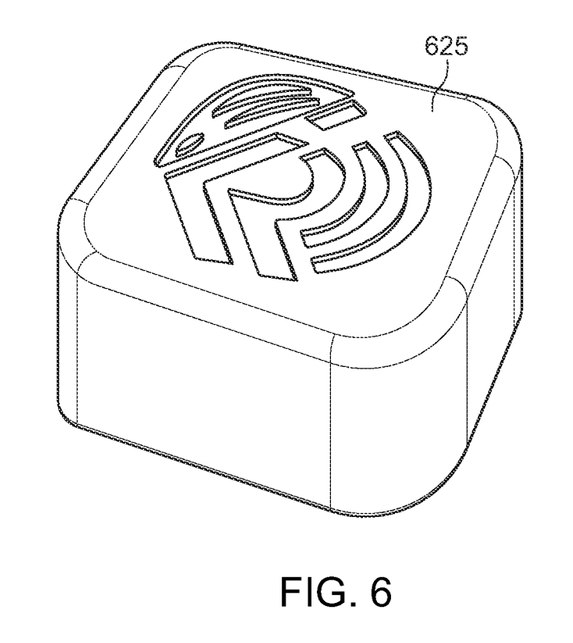
FIG. 6 is a view of an embodiment of a helmet alarm unit.
Figure 7:
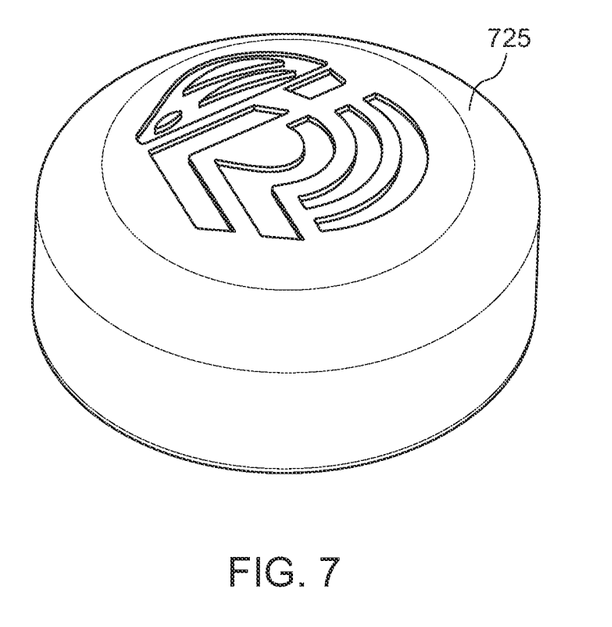
FIG. 7 is a view of an embodiment of a helmet alarm unit.

Shown in FIGS. 5-7 are different embodiments of helmet detection units.

FIG. 5 shows a helmet detection unit 525 that is wedge shaped. The wedge-shaped helmet detection unit 525 is adapted to be attached to vehicles in such a manner that it has profile that is not too visible when placed on a vehicle. The wedge-shaped helmet detection unit 525 may have an alarm unit located within the helmet detection unit 525. In an embodiment, the helmet detection unit 525 may have visual alarms, such as strobing lights, to attract the attention of people who may be deaf or otherwise auditorily impaired. In an embodiment, the helmet detection unit 525 is operably connected to a helmet and interacts with a vehicle to inhibit using the vehicle without a helmet.

FIG. 6 shows a helmet detection unit 625 that is cube shaped. The cube-shaped helmet detection unit 625 is adapted to be attached to vehicles in such a manner that it can be placed on a vehicle in an easy manner. The cube-shaped helmet detection unit 625 may have an alarm unit located within the helmet detection unit 625. In an embodiment, the helmet detection unit 625 may have visual alarms, such as strobing lights, to attract the attention of people who may be deaf or otherwise auditorily impaired. In an embodiment, the helmet detection unit 625 is operably connected to a helmet and interacts with a vehicle to inhibit using the vehicle without a helmet.

FIG. 7 shows a helmet detection unit 725 that is cylindrical shaped. The cylindrical-shaped helmet detection unit 725 is adapted to be attached to vehicles in such a manner that it can be placed on a vehicle in an easy manner. The cylindrical-shaped helmet detection unit 725 may have an alarm unit located within the helmet detection unit 725. In an embodiment, the helmet detection unit 725 may have visual alarms, such as strobing lights, to attract the attention of people who may be deaf or otherwise auditorily impaired. In an embodiment, the helmet detection unit 725 is operably connected to a helmet and interacts with a vehicle to inhibit using the vehicle without a helmet.

Figure 8:
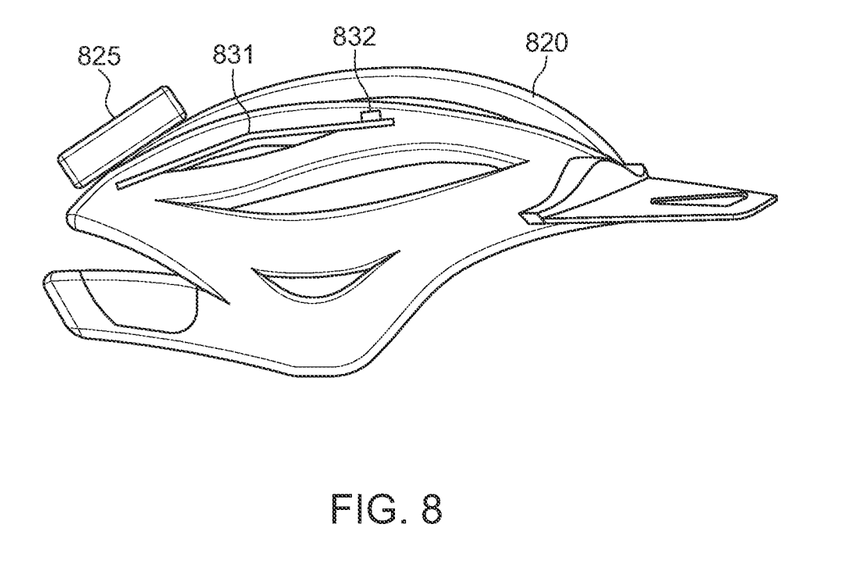
FIG. 8 is a view a helmet having a helmet alarm unit.

FIG. 8 shows a helmet 820 that has a helmet detection unit 825 operably connected to a portion of the helmet 820. In the embodiment shown in FIG. 8 the helmet detection unit 825 is operably connected to the back of the helmet 820. In an embodiment, the helmet detection unit 825 may be attached to any helmet. In an embodiment, the helmet detection unit is integrated into the helmet itself.

The helmet 820 additionally has operably located therein a lever 831 and a switch 832. When the helmet 820 is placed on the head of a user the lever 831 is moved and the switch 832 is activated. When the switch 832 is activated, a signal is sent to the helmet detection unit 825. The helmet detection unit 825 is then able to transmit a signal to a vehicle to enable it to operate. In an embodiment, the helmet detection unit 825 transmits a signal to the vehicle that disables an alarm or other notification system.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A safety system comprising:
    a helmet detection unit adapted to be operably connected to a vehicle, wherein the helmet detection unit is adapted to transmit a signal; and
    an alarm unit adapted to be operably connected to the vehicle;
    wherein the alarm unit is adapted to receive the signal from the helmet detection unit, wherein the alarm unit is adapted to trigger an alarm in response to determination that a user of the vehicle is not wearing a helmet; and
    wherein a plurality of user profiles is accessed by the alarm unit to determine a triggering of the alarm unit.

2. The safety system of claim 1, wherein the helmet detection unit determines the user of the vehicle is wearing the helmet via measurement of weight determined from a seat of the vehicle.

3. The safety system of claim 1, wherein the helmet detection unit determines if the user of the vehicle is wearing the helmet via measurement of determined from a foot area of the vehicle.

4. The safety system of claim 1, further comprising a secondary sensing system, wherein the secondary sensing system implements RFID.

5. The safety system of claim 1, wherein the helmet detection unit is further adapted to inertially sense that the helmet is located on a head of a user.

6. The safety system of claim 1, wherein the helmet detection unit is further adapted to optically sense that the helmet is located on a head of a user.

7. The safety system of claim 1, wherein the vehicle is a bicycle.

8. The safety system of claim 1, wherein the vehicle is a moped.

9. The safety system of claim 1, wherein the vehicle is a scooter.

10. The safety system of claim 1, wherein the alarm unit has a time delay.

11. The safety system of claim 1, wherein the helmet detection unit is integrally formed with the seat of the vehicle.

12. The safety system of claim 1, wherein the helmet detection unit is removably attached to the seat of the vehicle.

13. A method for providing safety comprising:
    determining if a helmet is being worn by a user with a helmet detection unit operably located on a vehicle,
    transmitting a signal when the helmet detection unit determines the helmet is not being worn;
    receiving the signal at an alarm unit located on the vehicle; and
    triggering an alarm from the alarm unit; and
    wherein a plurality of user profiles is accessed by the alarm unit to determine a triggering of the alarm unit.

14. The method of claim 13, wherein the helmet detection unit determines the user of the vehicle is wearing the helmet via measurement of weight determined from a seat of the vehicle.

15. The method of claim 13, wherein the helmet detection unit determines if the user of the vehicle is wearing the helmet via measurement of determined from a foot area of the vehicle.

16. The method of claim 13, wherein the helmet detection unit is further adapted to inertially sense that the helmet is located on a head of a user.

17. The method of claim 13, further comprising a secondary sensing system, wherein the secondary sensing system implements RFID.

18. The method of claim 13, wherein the vehicle is a bicycle.

19. The method of claim 13, wherein the vehicle is a moped.

20. The method of claim 13, wherein the vehicle is a scooter.

* * * * *